US012643261B2

(12) United States Patent
Zhou et al.

(10) Patent No.: US 12,643,261 B2
(45) Date of Patent: Jun. 2, 2026

(54) HEATING TUBE, MANUFACTURING METHOD THEREOF, AND AEROSOL GENERATING DEVICE

(71) Applicant: Jiangmen Moore Technology., Ltd, Jiangmen (CN)

(72) Inventors: Hongming Zhou, Jiangmen (CN); Rihong Li, Jiangmen (CN); Huanxi Li, Jiangmen (CN); Xianwu Du, Jiangmen (CN)

(73) Assignee: Jiangmen Moore Technology., Ltd, Jiangmen (CN)

( * ) Notice: Subject to any disclaimer, the term of this patent is extended or adjusted under 35 U.S.C. 154(b) by 253 days.

(21) Appl. No.: 18/341,335

(22) Filed: Jun. 26, 2023

(65) Prior Publication Data

US 2023/0330892 A1 Oct. 19, 2023

Related U.S. Application Data

(63) Continuation of application No. PCT/CN2021/133703, filed on Nov. 26, 2021.

(30) Foreign Application Priority Data

Dec. 29, 2020 (CN) ........................ 202011592649.9

(51) Int. Cl.

| | |
|---|---|
| ***B32B 11/04*** | (2006.01) |
| ***A24F 40/46*** | (2020.01) |
| ***A24F 40/70*** | (2020.01) |
| ***B28B 11/04*** | (2006.01) |
| ***H05B 3/26*** | (2006.01) |

(52) U.S. Cl.

CPC .............. *B28B 11/04* (2013.01); *A24F 40/46* (2020.01); *A24F 40/70* (2020.01); *H05B 3/265* (2013.01); *H05B 2203/013* (2013.01); *H05B 2203/017* (2013.01)

(58) Field of Classification Search

CPC .......... B28B 11/04; A24F 40/70; A24F 40/46; H05B 3/265

See application file for complete search history.

(56) References Cited

FOREIGN PATENT DOCUMENTS

| | | | |
|---|---|---|---|
| CN | 2457831 | * | 10/2001 |
| CN | 204483027 | U | 7/2015 |
| CN | 104770895 | B | 8/2017 |
| CN | 108338417 | A | 7/2018 |
| CN | 109363249 | A | 2/2019 |

(Continued)

OTHER PUBLICATIONS

Patent Cooperation Treaty, International Search Report and Written Opinion, International Application No. PCT/CN2021/133703 (Feb. 15, 2022).

(Continued)

*Primary Examiner* — Mathieu D Vargot

(74) *Attorney, Agent, or Firm* — Leydig, Voit & Mayer, Ltd.

(57) ABSTRACT

A manufacturing method for a heating tube includes: step S1: preparing a tubular blank including a substrate blank, an electric heating blank layer being arranged on an inner side of the substrate blank, and an infrared radiation blank layer being arranged on an inner side of the electric heating blank layer; and step S2: molding the tubular blank by sintering.

20 Claims, 8 Drawing Sheets

(56) References Cited

FOREIGN PATENT DOCUMENTS

| | | | | | |
|---|---|---|---|---|---|
| CN | 109770433 | A | | 5/2019 | |
| CN | 110074461 | | * | 8/2019 | |
| CN | 110074461 | A | | 8/2019 | |
| CN | 209573235 | U | | 11/2019 | |
| CN | 111407001 | A | | 7/2020 | |
| CN | 212117075 | U | | 12/2020 | |
| CN | 112641134 | A | | 4/2021 | |
| CN | 216019092 | U | | 3/2022 | |
| WO | WO-2016207407 | A1 | * | 12/2016 | ............. A24F 40/20 |
| WO | 2019178800 | A1 | | 9/2019 | |

OTHER PUBLICATIONS

European Patent Office, Search Report in European Patent Application No. 21913669.4 (May 16, 2024).
Chinese Patent Office, Office Action in Chinese Patent Application No. 202011592649.9 (Mar. 16, 2024).

* cited by examiner

HEATING TUBE, MANUFACTURING METHOD THEREOF, AND AEROSOL GENERATING DEVICE

CROSS-REFERENCE TO PRIOR APPLICATION

This application is a continuation of International Patent Application No. PCT/CN2021/133703, filed on Nov. 26, 2021, which claims priority to Chinese Patent Application No. 202011592649.9, filed on Dec. 29, 2020. The entire disclosure of both applications is hereby incorporated by reference herein.

FIELD

The present invention relates to the field of vaporization, and more specifically, to a heating tube, a manufacturing method thereof, and an aerosol generating device.

BACKGROUND

A heat-not-burn vaporization device is an aerosol generating device that heats at a low temperature rather than burns a vaporization material to form inhalable vapor. Currently, different types of heating bodies have been introduced at home and abroad to heat vaporization materials, such as a heating body in a shape of a sheet, a rod (pin), or a tube.

In a tubular heating body, a vaporization material is inserted into a heating tube, and a resistance material on the wall surface of the heating tube generates heat after energized, to heat the vaporization material in the heating tube and conduct heat in the vaporization material. The tubular heating body is widely applied due to a large heating area on the periphery and high heating uniformity. Currently, in the tubular heating body, a heating circuit is generally arranged on the outer surface of the heating tube and is mainly manufactured by using a resistance wire process. The molding process method is undiversified. In addition, thermal conduction is a main heating method, and there is a thermal conduction distance between a heating layer and the vaporization material, which leads to heat loss and lower heating efficiency.

SUMMARY

In an embodiment, the present invention provides a manufacturing method for a heating tube, comprising: step S1: preparing a tubular blank comprising a substrate blank, an electric heating blank layer being arranged on an inner side of the substrate blank, and an infrared radiation blank layer being arranged on an inner side of the electric heating blank layer; and step S2: molding the tubular blank by sintering.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
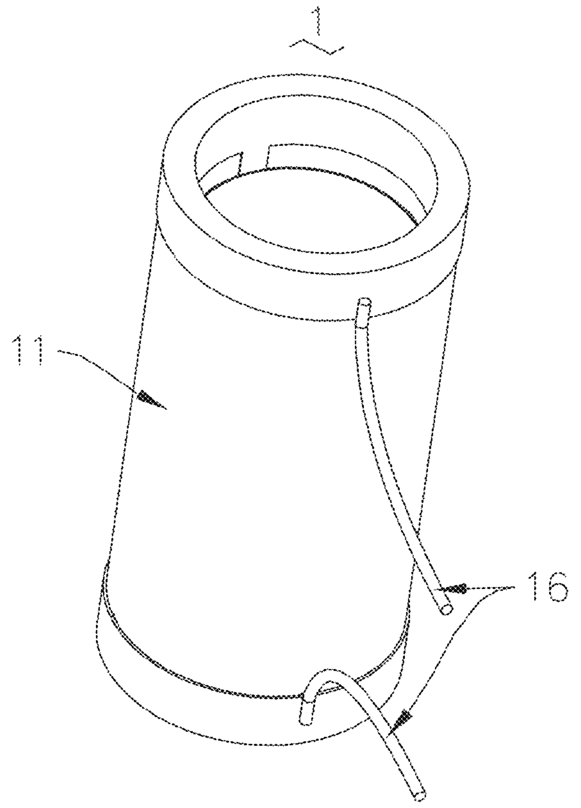
FIG. 1 is a three-dimensional schematic structural diagram of a heating tube according to some embodiments of the present invention.

In an embodiment, the present invention provides an improved heating tube, a manufacturing method thereof, and an aerosol generating device, to overcome the forgoing defects in the prior art.

In an embodiment, the present invention provides a manufacturing method for a heating tube, including the following steps:

- step S1: preparing a tubular blank, where the tubular blank includes a substrate blank, an electric heating blank layer arranged on an inner side of the substrate blank, and an infrared radiation blank layer arranged on an inner side of the electric heating blank layer; and
- step S2: molding the tubular blank by sintering.

In some embodiments, step S1 includes:

- step S101: preparing a sheet-like substrate blank by a flow casting process;
- step S102: preparing a sheet-like electric heating blank layer on the sheet-like substrate blank;
- step S103: preparing a sheet-like infrared radiation blank layer on the sheet-like electric heating blank layer; and
- step S104: curling the sheet-like substrate blank, the sheet-like electric heating blank layer, and the sheet-like infrared radiation blank layer into tubes.

In some embodiments, the tubular blank further includes a priming layer blank arranged between the substrate blank and the electric heating blank layer.

Step S1 includes:

- step S111: preparing a sheet-like priming layer blank by a flow casting process;
- step S112: preparing a sheet-like electric heating blank layer on the sheet-like priming layer blank;
- step S113: preparing a sheet-like infrared radiation blank layer on the sheet-like electric heating blank layer; and
- step S114: curling the sheet-like priming layer blank, the sheet-like electric heating blank layer, and the sheet-like infrared radiation blank layer into tubes; and
- step S115: placing the priming layer blank, the electric heating blank layer, and the infrared radiation blank layer, which have been curled into tubes, in an injection molding outer layer to form the substrate blank.

In some embodiments, the sheet-like priming layer blank is made of a high-thermal-resistance porous ceramic material and the sheet-like priming layer blank has a thickness ranging from 10 μm to 40 μm.

In some embodiments, the tubular blank further includes a reflective blank layer and an insulating blank layer; and the reflective blank layer, the insulating blank layer, the electric heating blank layer, and the infrared radiation blank layer are sequentially arranged on an inner side of the tubular blank.

In some embodiments, step S1 includes:

step S121: preparing a sheet-like substrate blank by a flow casting process;

step S122: preparing a sheet-like reflective blank layer on the sheet-like substrate blank;

step S123: preparing a sheet-like insulating blank layer on the sheet-like reflective blank layer;

step S124: preparing a sheet-like electric heating blank layer on the sheet-like insulating blank layer;

step S125: preparing a sheet-like infrared radiation blank layer on the sheet-like electric heating blank layer; and step S126: curling the sheet-like substrate blank, the sheet-like reflective blank layer, the sheet-like insulating blank layer, the sheet-like electric heating blank layer, and the sheet-like infrared radiation blank layer into tubes.

In some embodiments, step S1 includes:

step S131: preparing a sheet-like reflective blank layer by a flow casting process;

step S132: preparing a sheet-like insulating blank layer on the sheet-like reflective blank layer;

step S133: preparing a sheet-like electric heating blank layer on the sheet-like insulating blank layer;

step S134: preparing a sheet-like infrared radiation blank layer on the sheet-like electric heating blank layer; and step S135: curling the sheet-like reflective blank layer, the sheet-like insulating blank layer, the sheet-like electric heating blank layer, and the sheet-like infrared radiation blank layer into tubes; and step S136: placing the sheet-like reflective blank layer, the sheet-like insulating blank layer, the electric heating blank layer, and the infrared radiation blank layer, which have been curled into tubes, in an injection molding outer layer to form the substrate blank.

In some embodiments, the reflective blank layer is made of a metal oxide slurry or powder with a high reflectivity, and the sheet-like insulating blank layer is made of a non-conductive slurry or powder.

In some embodiments, the reflective blank layer is formed by flow casting or spraying.

In some embodiments, the reflective blank layer has a thickness ranging from 10 μm to 200 μm.

In some embodiments, the insulating blank layer is formed by flow casting or spraying or screen printing.

In some embodiments, the insulating blank layer has a thickness ranging from 5 μm to 40 μm.

In some embodiments, the substrate blank is made of a high-thermal-resistance porous ceramic material.

In some embodiments, in step S2, a temperature of the sintering ranges from 600° C. to 1600° C.

In some embodiments, the electric heating blank layer is made by screen printing or physical vapor deposition (PVD).

In some embodiments, the electric heating blank layer includes a conductive circuit and a heating film, and a resistivity of the conductive circuit is less than a resistivity of the heating film.

In some embodiments, the infrared radiation blank layer is made of at least one of $Fe_2O_3$, $MnO_2$, $Co_2O_3$, $ZrO_2$, $SiO_2$, SiC, $TiO_2$, $Al_2O_3$, $CeO_2$, $La_2O_3$, MgO, cordierite, or perovskite.

In some embodiments, the electric heating blank layer has a thickness ranging from 20 μm to 100 μm and the infrared radiation blank layer has a thickness ranging from 10 μm to 200 μm.

The present invention further provides a heating tube, where the heating tube is manufactured by using the manufacturing method described above.

The present invention further provides an aerosol generating device, including the heating tube described above.

Beneficial Effects:

Implementation of the present invention at least has the following beneficial effects: The heating tube is integrally formed by sintering, and has a simple structure and high reliability. An electric heating layer and an infrared radiation layer are arranged on an inner surface of a substrate tube. The electric heating layer and the infrared radiation layer are in direct contact with each other to excite radiation, thereby greatly increasing a radiation heating ratio and shortening a thermal conduction distance and a radiation distance among the electric heating layer, the infrared radiation layer, and an aerosol-forming substrate. In this way, the heating efficiency and the heating uniformity are improved.

In order to facilitate a clearer understanding of the technical features, the objectives, and the effects of the present invention, specific implementations of the present invention are now illustrated in detail with reference to the accompanying drawings.

Figure 2:
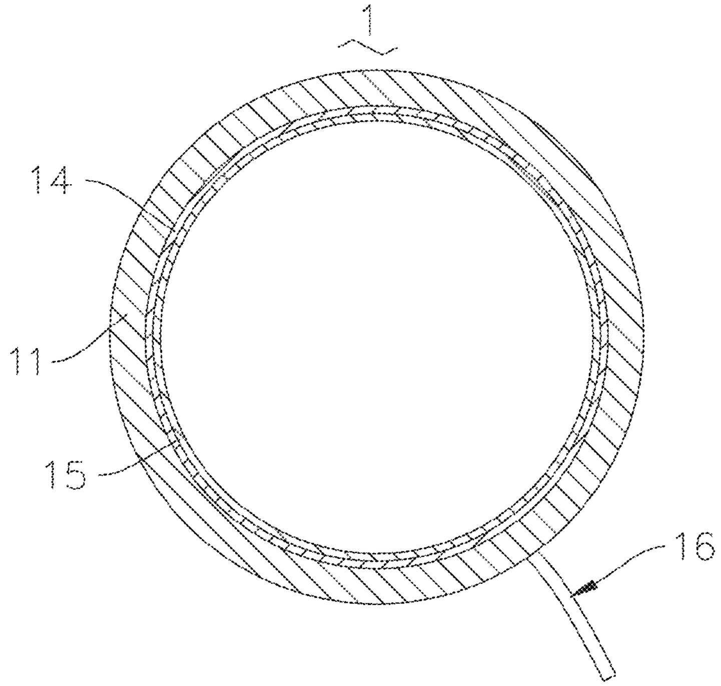
FIG. 2 is a schematic cross-sectional structural view of a heating tube according to a first embodiment of the present invention.
Figure 3:
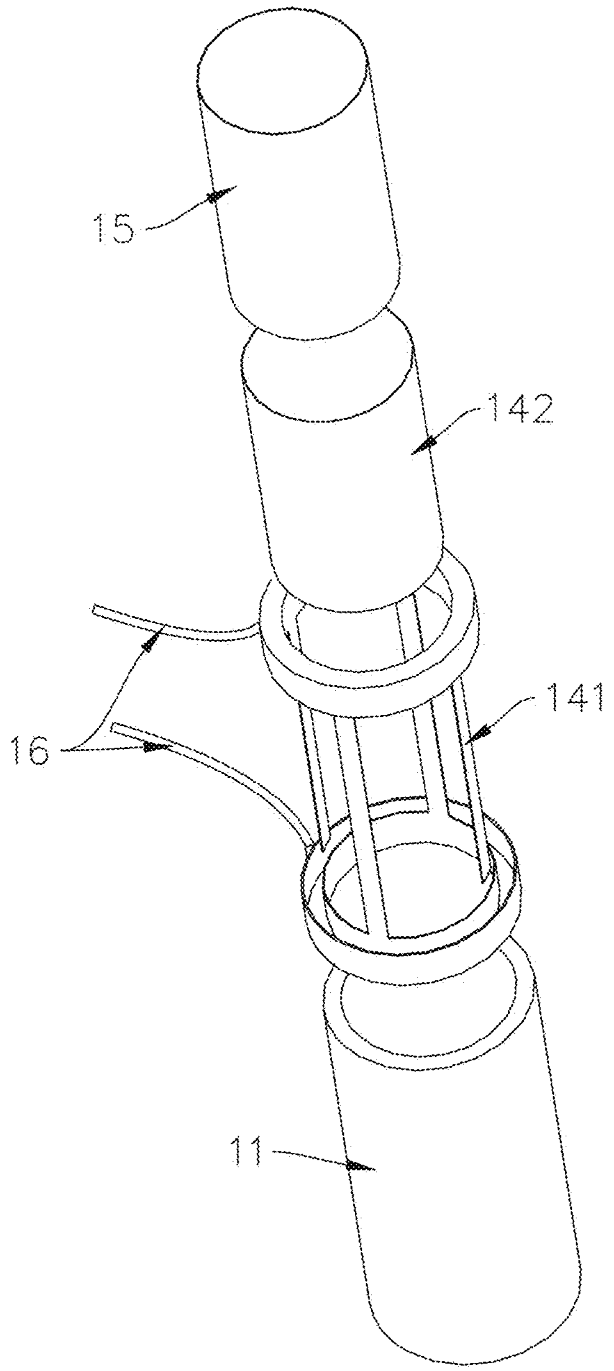
FIG. 3 is a schematic exploded structural view of the heating tube shown in FIG. 2.

As shown in FIG. 1 to FIG. 3, a heating tube 1 in a first embodiment of the present invention may include a substrate tube 11, an electric heating layer 14 arranged on an inner side of the substrate tube 11, an infrared radiation layer 15 arranged on an inner side of the electric heating layer 14, and two electrode lead wires 16 electrically connected to the electric heating layer 14. The heating tube 1 may be in a shape of a circular tube. In other embodiments, the heating tube 1 may also be in other shapes such as an elliptical tube or a square tube.

The substrate tube 11 may be in a shape of a circular tube and made of a high-thermal-resistance porous ceramic material such as porous diatomite, and has thermal insulation and electric insulation functions. The infrared radiation layer 15 may be made of at least one of $Fe_2O_3$, $MnO_2$, $Co_2O_3$, $ZrO_2$, $SiO_2$, SiC, $TiO_2$, $Al_2O_3$, $CeO_2$, $La_2O_3$, MgO, cordierite, or perovskite. The infrared radiation layer 15 may have a thickness ranging from 10 μm to 200 μm, and preferably, 10 μm to 80 μm.

The electric heating layer 14 may have a thickness ranging from 20 μm to 100 μm, and preferably, 20 μm to 60 μm. The electric heating layer 14 may include a conductive circuit 141 arranged on an inner side wall of the substrate tube 11 and a heating film 142 arranged on an inner side wall of the substrate tube 11. The conductive circuit 141 is mainly configured to form a suitable conductive trajectory pattern, to distribute heating regions as required. The heating film 142 is mainly configured to generate heat after energized. The conductive circuit 141 and the heating film 142 may be made of different materials by processes such as screen printing or physical vapor deposition (PVD). The conductive circuit 141 may be made of a lower-resistivity material that generates less heat, and the heating film 142 may be made of a higher-resistivity material that generates more heat.

Figure 4:
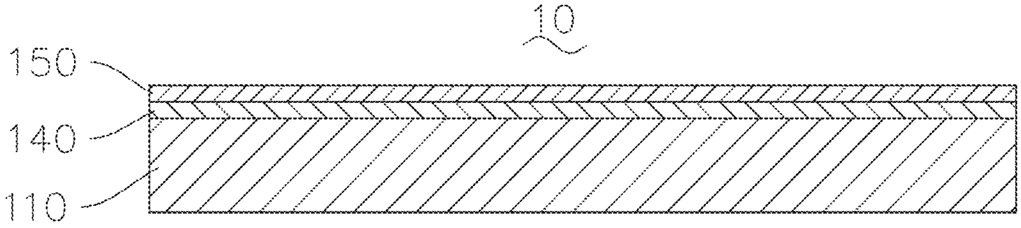
FIG. 4 to FIG. 5 are schematic structural diagrams of the heating tube shown in FIG. 2 in a first manufacturing process.
Figure 5:
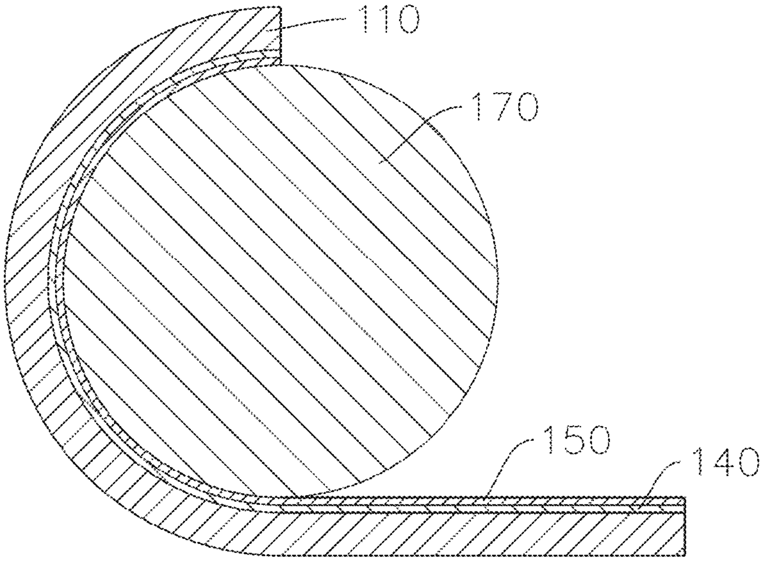

As shown in FIG. 4 to FIG. 5, the heating tube 1 may be manufactured by using the following method:

Step S1: Prepare a tubular blank 10.

Step S2: Mold the tubular blank 10 by sintering.

The tubular blank 10 may include a tubular substrate blank 110, a tubular electric heating blank layer 140 arranged on an inner side of the tubular substrate blank 110, and a tubular infrared radiation blank layer 150 arranged on an inner side of the tubular electric heating blank layer 140. After sintering, the tubular substrate blank 110, the tubular electric heating blank layer 140, and the tubular infrared radiation blank layer 150 form the substrate tube 11, the electric heating layer 14, and the infrared radiation layer 15 respectively. A temperature of the sintering may range from 600° C. to 1600° C. The two electrode lead wires 16 may be fixed on outer end surfaces at both ends of the heating tube 1 by PVD or welding before or after the sintering.

Further, Step S1 may include:

Step S101: Prepare a sheet-like substrate blank 110 by a flow casting process, where the sheet-like substrate blank 110 may have a thickness ranging from 0.6 mm to 3 mm.

Step S102: Prepare a sheet-like electric heating blank layer 140 on the sheet-like substrate blank 110 by a screen printing or PVD process.

Step S103: Prepare a sheet-like infrared radiation blank layer 150 on the sheet-like electric heating blank layer 140 by a screen printing or PVD or flow casting process; and Step S104: Curl the sheet-like substrate blank 110, the sheet-like electric heating blank layer 140, and the sheet-like infrared radiation blank layer 150 into tubes by using a mandrel 170, to form the tubular substrate blank 110, the tubular electric heating blank layer 140, and the tubular infrared radiation blank layer 150 respectively, where the tubular infrared radiation blank layer 150 is located on the inner side.

Figure 6:
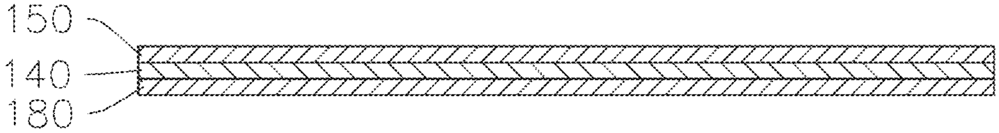
FIG. 6 to FIG. 7 are schematic structural diagrams of the heating tube shown in FIG. 2 in a second manufacturing process.
Figure 7:
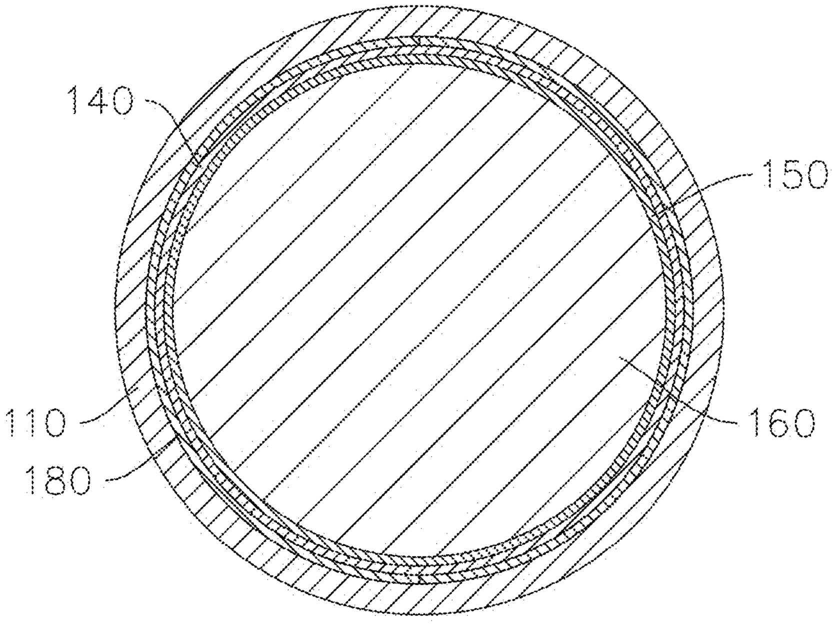

As shown in FIG. 6 to FIG. 7, in another embodiment, the tubular blank 10 may further include a tubular priming layer 180 arranged between the tubular substrate blank 110 and the tubular electric heating blank layer 140. The tubular substrate blank 110 and the tubular priming layer 180 together form the substrate tube 11 after sintering.

The tubular blank 10 may also be prepared by using the following method:

Step S111: Prepare a thin sheet-like priming layer blank 180 as a base by a flow casting process, where the sheet-like priming layer blank 180 may have a thickness ranging from 10 μm to 40 μm.

Step S112: Prepare a sheet-like electric heating blank layer 140 on the sheet-like priming layer blank 180 by a screen printing or PVD process.

Step S113: Prepare a sheet-like infrared radiation blank layer 150 on the sheet-like electric heating blank layer 140 by a screen printing or PVD or flow casting process.

Step S114: Curl the sheet-like priming layer blank 180, the sheet-like electric heating blank layer 140, and the sheet-like infrared radiation blank layer 150 into tubes by using a mandrel 170 to form the tubular priming layer blank 180, the tubular electric heating blank layer 140, and the tubular infrared radiation blank layer 150 respectively, where the tubular infrared radiation blank layer 150 is located on the inner side.

Step S115: Place the tubular priming layer blank 180, the tubular electric heating blank layer 140, and the tubular infrared radiation blank layer 150 in an injection molding outer layer to form the tubular substrate blank 110, where the tubular substrate blank 110 may have a thickness ranging from 0.6 mm to 3 mm.

In this method, the sheet-like priming layer blank 180 is first formed as a base by flow casting, to obtain a small total thickness during the curling, so that it is easier to control a curl-fitting process.

Figure 8:
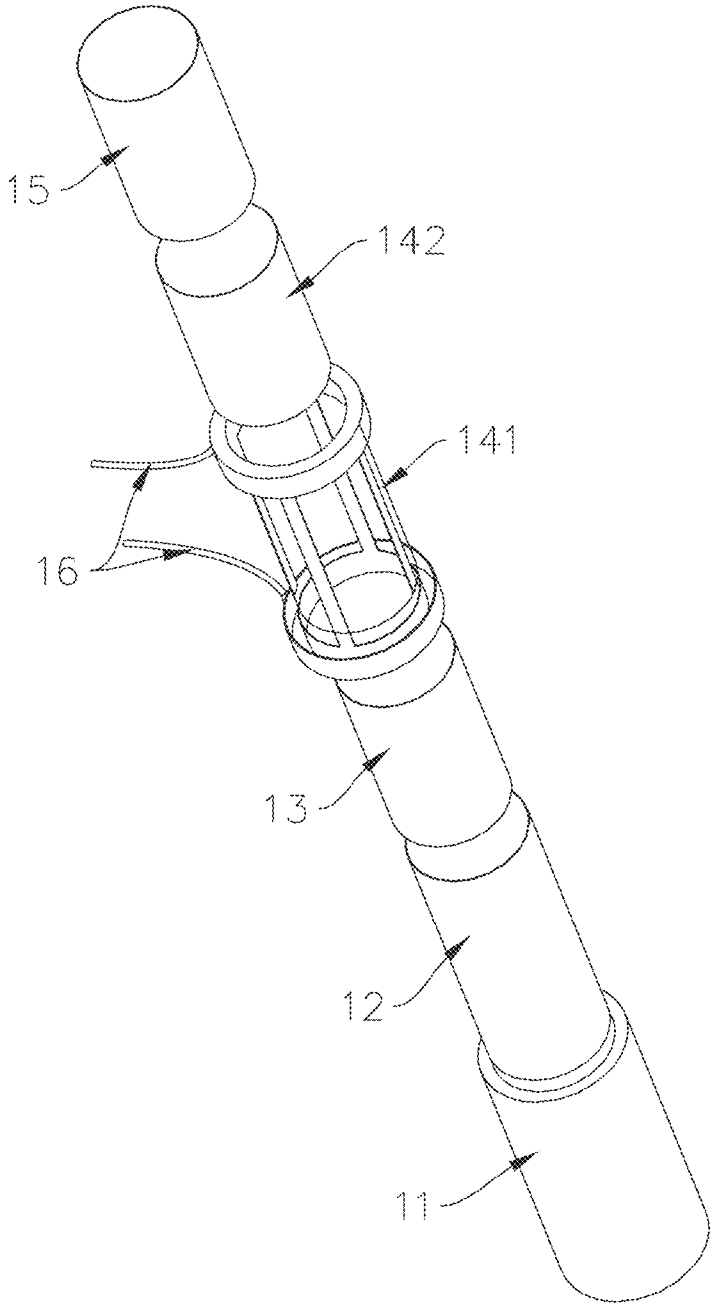
FIG. 8 is a schematic exploded structural view of a heating tube according to a second embodiment of the present invention.
Figure 9:
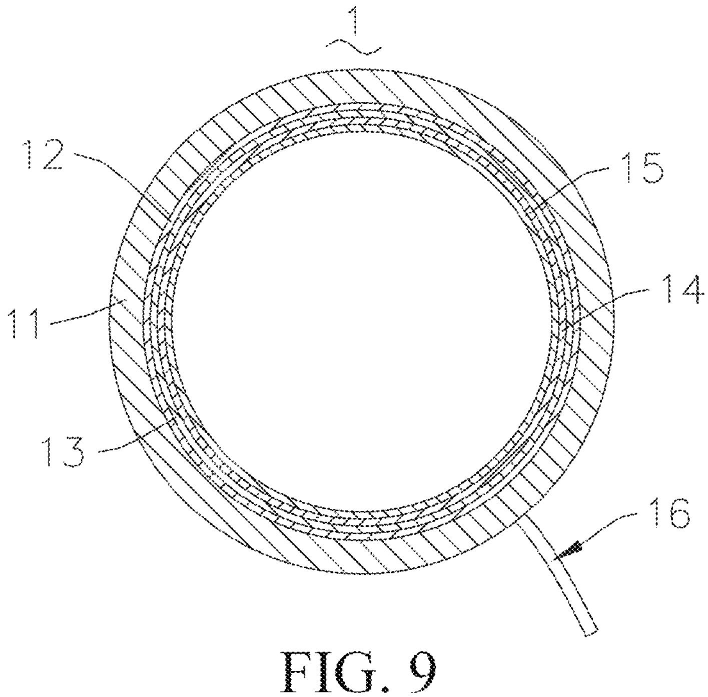
FIG. 9 a schematic cross-sectional structural view of the heating tube shown in FIG. 8.

FIG. 8 to FIG. 9 show a heating tube 1 according to a second embodiment of the present invention. Compared with the heating tube 1 in the first embodiment, the heating tube 1 in this embodiment further includes a reflective layer 12 and an insulating layer 13. The reflective layer 12, the insulating layer 13, the electric heating layer 14, and the infrared radiation layer 15 are sequentially arranged on the inner side of the substrate tube 11.

The reflective layer 12 is arranged on the inner side wall of the substrate tube 11, and may be made of a metal oxide slurry or powder with a high reflectivity, such as a $SnO_2$ based, $In_2O_3$ based, or ZnO based material, or a composite doped material thereof. The thickness of the reflective layer 12 may range from 10 μm to 200 μm. The insulating layer 13 is arranged between the reflective layer 12 and the electric heating layer 14 to insulate the reflective layer 12 from the electric heating layer 14. The insulating layer 13 may be made of a non-conductive slurry or powder, such as ZrO, $SiO_2$, or $Al_2O_3$, and the insulating layer 13 may have a thickness ranging from 5 μm to 40 μm, and preferably from 5 μm to 20 μm.

Figure 10:
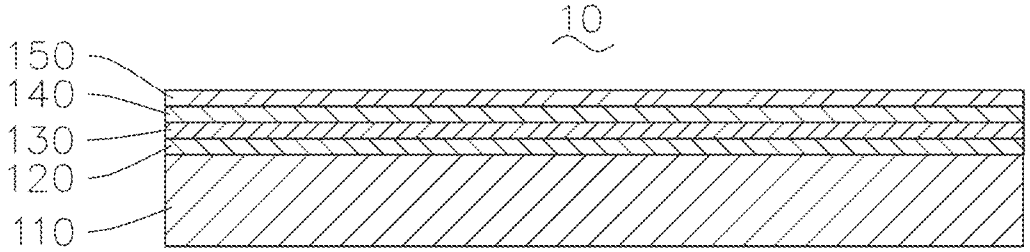
FIG. 10 to FIG. 11 are schematic structural diagrams of the heating tube shown in FIG. 9 in a third manufacturing process.
Figure 11:
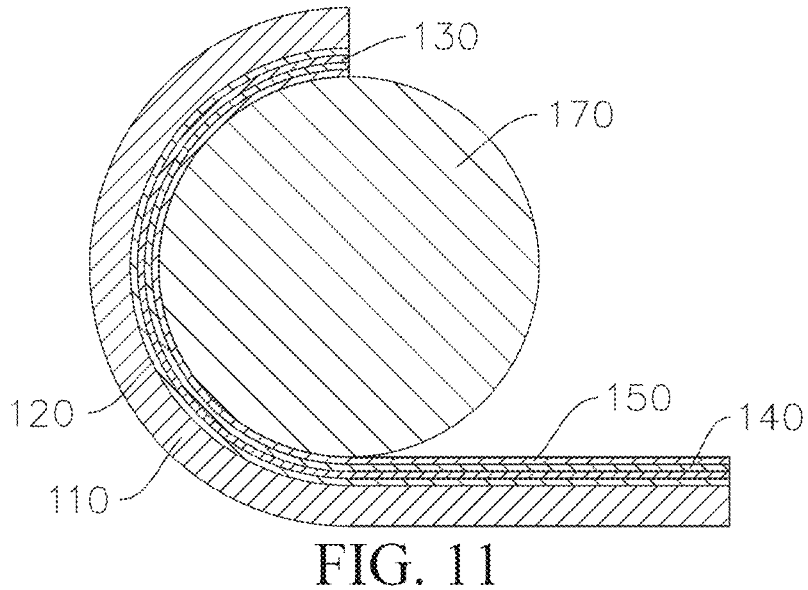

As shown in FIG. 10 to FIG. 11, the heating tube 1 may be manufactured by using the following method:

Step S1: Prepare a tubular blank 10.

Step S2: Mold the tubular blank 10 by sintering.

The tubular blank 10 may include a tubular substrate blank 110, a tubular reflective blank layer 120 arranged on an inner side of the tubular substrate blank 110, a tubular insulating blank layer 130 arranged on an inner side of the tubular reflective blank layer 120, a tubular electric heating blank layer 140 arranged on an inner side of the tubular insulating blank layer 130, and a tubular infrared radiation blank layer 150 arranged on an inner side of the tubular electric heating blank layer 140. The substrate blank 110, the tubular reflective blank layer 120, the tubular insulating blank layer 130, the tubular electric heating blank layer 140, and the tubular infrared radiation blank layer 150 form the substrate tube 11, the reflective layer 12, the insulating layer 13, the electric heating layer 14, and the infrared radiation layer 15 respectively after sintering. A temperature of the sintering may range from 600° C. to 1600° C.

Further, Step S1 may include:

Step S121: Prepare a sheet-like substrate blank 110 by a flow casting process.

Step S122: Prepare a sheet-like reflective blank layer 120 on the sheet-like substrate blank 110 by a flow casting or spraying process.

Step S123: Prepare a sheet-like insulating blank layer 130 on the sheet-like reflective blank layer 120 by a flow casting or spraying or screen printing process.

Step S124: Prepare a sheet-like electric heating blank layer 140 on the sheet-like insulating blank layer 130 by a screen printing or PVD process.

Step S125: Prepare a sheet-like infrared radiation blank layer 150 on the sheet-like electric heating blank layer 140 by a screen printing or PVD or flow casting process.

Step S126: Curl the sheet-like substrate blank 110, the sheet-like reflective blank layer 120, the sheet-like insulating blank layer 130, the sheet-like electric heating blank layer 140, and the sheet-like infrared radiation blank layer 150 into tubes by using a mandrel 170 to form the tubular substrate blank 110, the tubular reflective blank layer 120, the tubular insulating blank layer 130, the tubular electric heating blank layer 140, and the tubular infrared radiation blank layer 150 respectively, where the tubular infrared radiation blank layer 150 is located on the inner side.

Figure 12:
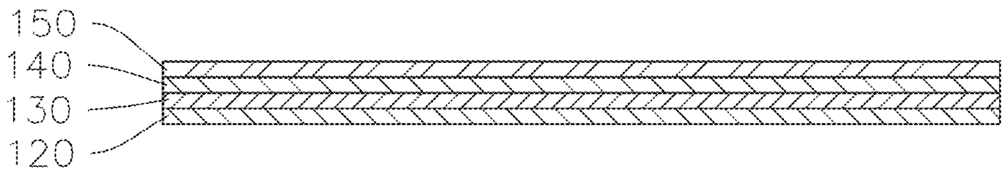
FIG. 12 to FIG. 13 are schematic structural diagrams of the heating tube shown in FIG. 9 in a fourth manufacturing process.
Figure 13:
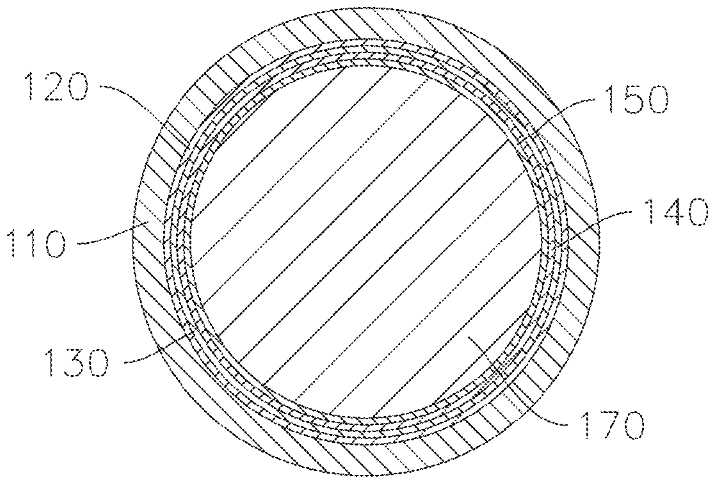

As shown in FIG. 12 to FIG. 13, the tubular blank 10 may also be prepared by using the following method:

Step S131: Prepare a sheet-like reflective blank layer 120 by a flow casting process.

Step S132: Prepare a sheet-like insulating blank layer 130 on the sheet-like reflective blank layer 120 by a flow casting or spraying or screen printing process.

Step S133: Prepare a sheet-like electric heating blank layer 140 on the sheet-like insulating blank layer 130 by a screen printing or PVD process.

Step S134: Prepare a sheet-like infrared radiation blank layer 150 on the sheet-like electric heating blank layer 140 by a screen printing or PVD or flow casting process.

Step S135: Curl the sheet-like reflective blank layer 120, the sheet-like insulating blank layer 130, the sheet-like electric heating blank layer 140, and the sheet-like infrared radiation blank layer 150 into tubes by using a mandrel 170 to form the tubular reflective blank layer 120, the tubular insulating blank layer 130, the tubular electric heating blank layer 140, and the tubular infrared radiation blank layer 150 respectively.

Step S136: Place the tubular reflective blank layer 120, the tubular insulating blank layer 130, the tubular electric heating blank layer 140, and the tubular infrared radiation blank layer 150 in an injection molding outer layer to form the tubular substrate blank 110.

Figure 14:
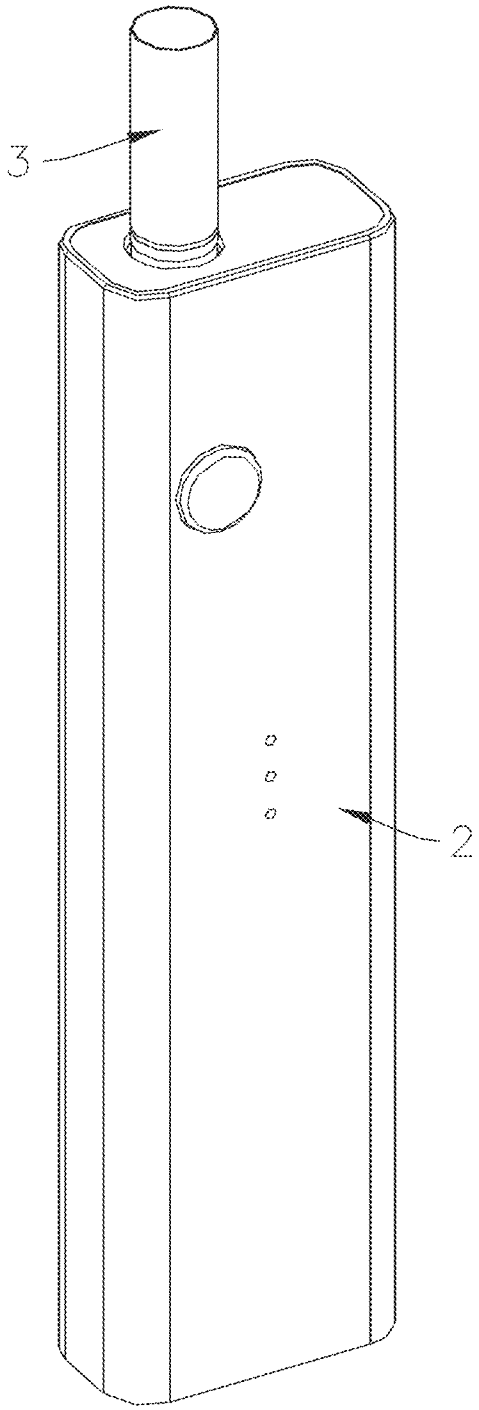
FIG. 14 is a three-dimensional schematic structural diagram of an aerosol generating device according to some embodiments of the present invention.

As shown in FIG. 14, the present invention further provides an aerosol generating device. The aerosol generating device may be roughly in a square column shape and includes a housing 2, a heating tube 1 arranged inside the housing 2, and a battery arranged inside the housing 2 and electrically connected to the heating tube 1. An aerosol-forming substrate 3 may be inserted into the housing 2 from the top of the housing 2 and extend into the heating tube 1. The heating tube 1 heats and bakes the aerosol-forming substrate 3 after energized and heated, to form vapor that can be inhaled by a user. In some embodiments, the aerosol-forming substrate 3 may be a cigarette. It may be understood that the aerosol generating device is not limited to being in the square column shape, but may be in another shape, such as a circular column shape.

The heating tube 1 in the present invention at least has the following advantages:

1. The heating tube 1 is integrally formed by sintering, and has a simple structure and high reliability.
2. The electric heating layer 14 and the infrared radiation layer 15 are arranged on the inner surface of the substrate tube 11; the electric heating layer 14 and the infrared radiation layer 15 are in direct contact with each other to excite radiation, thereby greatly increasing a radiation heating ratio and shortening a thermal conduction distance and a radiation distance among the electric heating layer 14, the infrared radiation layer 15, and the aerosol-forming substrate 3. In this way, the heating efficiency and the heating uniformity are improved.
3. The reflective layer 12 is arranged in the substrate tube 11, and radiation is directly reflected inside the substrate tube 11, to reduce radiation escaping to the outside of the substrate tube 11 and lower a surface temperature of the heating tube 1, thereby helping improve the overall performance of the aerosol generating device and the user experience, and also reducing the radiation emission range and increasing the radiation utilization.

It may be understood that the foregoing technical features can be used in any combination without limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A manufacturing method for a heating tube, comprising:

step S1: preparing a tubular blank comprising a substrate blank, an electric heating blank layer being arranged on an inner side of the substrate blank, and an infrared radiation blank layer being arranged on an inner side of the electric heating blank layer, wherein the electric heating blank layer and the infrared radiation blank layer are in direct contact with each other to excite radiation; and step S2: molding the tubular blank by sintering.

2. The manufacturing method of claim 1, wherein step S1 comprises:

step S101: preparing a sheet-like substrate blank by a flow casting process;

step S102: preparing a sheet-like electric heating blank layer on the sheet-like substrate blank;

step S103: preparing a sheet-like infrared radiation blank layer on the sheet-like electric heating blank layer; and step S104: curling the sheet-like substrate blank, the sheet-like electric heating blank layer, and the sheet-like infrared radiation blank layer into tubes.

3. The manufacturing method of claim 1, wherein the tubular blank further comprises a priming layer blank arranged between the substrate blank and the electric heating blank layer, and wherein step S1 comprises:

step S111: preparing a sheet-like priming layer blank by a flow casting process;

step S112: preparing a sheet-like electric heating blank layer on the sheet-like priming layer blank;

step S113: preparing a sheet-like infrared radiation blank layer on the sheet-like electric heating blank layer; and step S114: curling the sheet-like priming layer blank, the sheet-like electric heating blank layer, and the sheet-like infrared radiation blank layer into tubes; and step S115: placing the priming layer blank, the electric heating blank layer, and the infrared radiation blank layer, which have been curled into tubes, in an injection molding outer layer to form the substrate blank.

4. The manufacturing method of claim 3, wherein the sheet-like priming layer blank comprises a high-thermal-resistance porous ceramic material and the sheet-like priming layer blank has a thickness ranging from 10 μm to 40 μm.

5. The manufacturing method of claim 1, wherein the tubular blank further comprises a reflective blank layer and an insulating blank layer, and wherein the reflective blank layer, the insulating blank layer, the electric heating blank layer, and the infrared radiation blank layer are sequentially arranged on an inner side of the tubular blank.

6. The manufacturing method of claim 5, wherein step S1 comprises:

step S121: preparing a sheet-like substrate blank by a flow casting process;

step S122: preparing a sheet-like reflective blank layer on the sheet-like substrate blank;

step S123: preparing a sheet-like insulating blank layer on the sheet-like reflective blank layer;

step S124: preparing a sheet-like electric heating blank layer on the sheet-like insulating blank layer; and step S125: preparing a sheet-like infrared radiation blank layer on the sheet-like electric heating blank layer; and step S126: curling the sheet-like substrate blank, the sheet-like reflective blank layer, the sheet-like insulating blank layer, the sheet-like electric heating blank layer, and the sheet-like infrared radiation blank layer into tubes.

7. The manufacturing method of claim 5, wherein step S1 comprises:

step S131: preparing a sheet-like reflective blank layer by a flow casting process;

step S132: preparing a sheet-like insulating blank layer on the sheet-like reflective blank layer;

step S133: preparing a sheet-like electric heating blank layer on the sheet-like insulating blank layer;

step S134: preparing a sheet-like infrared radiation blank layer on the sheet-like electric heating blank layer;

step S135: curling the sheet-like reflective blank layer, the sheet-like insulating blank layer, the sheet-like electric heating blank layer, and the sheet-like infrared radiation blank layer into tubes; and step S136: placing the sheet-like reflective blank layer, the sheet-like insulating blank layer, the electric heating blank layer, and the infrared radiation blank layer, which have been curled into tubes, in an injection molding outer layer to form the substrate blank.

8. The manufacturing method of claim 5, wherein the reflective blank layer comprises a metal oxide slurry or powder with a high reflectivity, and the sheet-like insulating blank layer comprises a non-conductive slurry or powder.

9. The manufacturing method of claim 5, wherein the reflective blank layer is formed by flow casting or spraying.

10. The manufacturing method of claim 5, wherein the reflective blank layer has a thickness ranging from 10 μm to 200 μm.

11. The manufacturing method of claim 5, wherein the insulating blank layer is formed by flow casting or spraying or screen printing.

12. The manufacturing method of claim 5, wherein the insulating blank layer has a thickness ranging from 5 μm to 40 μm.

13. The manufacturing method of claim 1, wherein the substrate blank comprises a high-thermal-resistance porous ceramic material.

14. The manufacturing method of claim 1, wherein, in step S2, a temperature of the sintering ranges from 600° C. to 1600° C.

15. The manufacturing method of claim 1, wherein the electric heating blank layer is manufactured by screen printing or physical vapor deposition.

16. The manufacturing method of claim 1, wherein the electric heating blank layer comprises a conductive circuit and a heating film, and a resistivity of the conductive circuit is less than a resistivity of the heating film.

17. The manufacturing method of claim 1, wherein the infrared radiation blank layer comprises at least one of $Fe_2O_3$, $MnO_2$, $Co_2O_3$, $ZrO_2$, $SiO_2$, SiC, $TiO_2$, $Al_2O_3$, $CeO_2$, $La_2O_3$, MgO, cordierite, or perovskite.

18. The manufacturing method of claim 1, wherein the electric heating blank layer has a thickness ranging from 20 μm to 100 μm and the infrared radiation blank layer has a thickness ranging from 10 μm to 200 μm.

19. A heating tube manufactured using the manufacturing method of claim 1.

20. An aerosol generating device, comprising:

the heating tube of claim 19.

* * * * *